March 2, 1926.

E. C. WILSON

PIPE TONGS

Filed Oct. 4, 1922

Inventor:
Elihu C. Wilson

March 2, 1926.

E. C. WILSON

PIPE TONGS

Filed Oct. 4, 1922

Inventor:
Elihu C. Wilson
By James T. Barkelew.
his Attorneys

Patented Mar. 2, 1926.

1,575,141

UNITED STATES PATENT OFFICE.

ELIHU C. WILSON, OF LOS ANGELES, CALIFORNIA.

PIPE TONGS.

Application filed October 4, 1922. Serial No. 592,439.

*To all whom it may concern:*

Be it known that I, ELIHU C. WILSON, a citizen of the United States, residing in Los Angeles, county of Los Angeles, State of California, have invented new and useful Improvements in Pipe Tongs, of which the following is a specification.

This invention relates to pipe tongs such as are, for illustration, used for screwing and unscrewing pipe in well work; and a general object of the invention is to provide a tongs structure that, without the substitution of one tongs for another, will take different sizes of pipe or will take either a pipe or the pipe collar.

The tongs used in such work are usually large and heavy; so heavy that they are usually suspended in the derrick to facilitate their movement to and from and around the pipe. To use two tongs, one for the pipe itself and one for the collar, or to change tongs every time a different size of pipe has to be handled, results in a considerable loss of time; and saving of time is a very essential thing, particularly in rotary drilling. It is an object of this invention to overcome these and similar difficulties by providing, in a simple tongs, a means for gripping two or more sizes of pipe, or for gripping either the pipe or its collar.

By way of illustrating my present invention, I show in the accompanying drawings, and describe hereinafter the invention as applied to that type of tongs, and with that type of latch, that is included in the subject matter of my prior application on pipe tongs filed Sept. 12th, 1921, Ser. No. 500,-177, but I give this specific illustration and description only as illustrative of my invention, and it will be readily understood that the present invention may be applied to various types of tongs and various types of latches. Considering however, the invention in some of its more specific aspects, there are certain features of the invention in combination with the type of tongs herein described, All of this will be best understood from a perusal of the following description and a consideration of the appended claims.

For the purposes of the following illustrative description of the invention I illustrate in the accompanying drawings a preferred form of my present invention as applied to tongs of the character noted, in which drawings.

Figure 1:
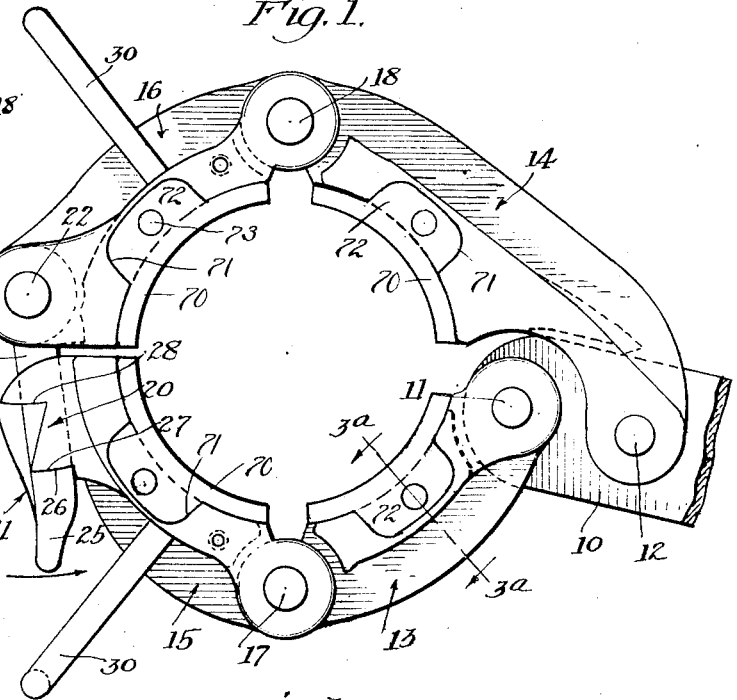
Fig. 1 is a plan of such a tongs equipped with my invention, the handle of the tongs being broken away for purposes of illustration.
Figure 3:
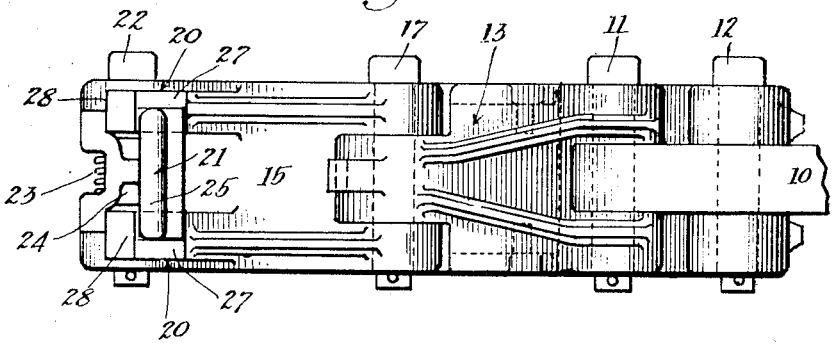
Fig. 3 is a side elevation of the same.
Figure 3A:
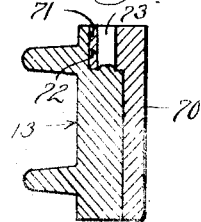
Figure 4:
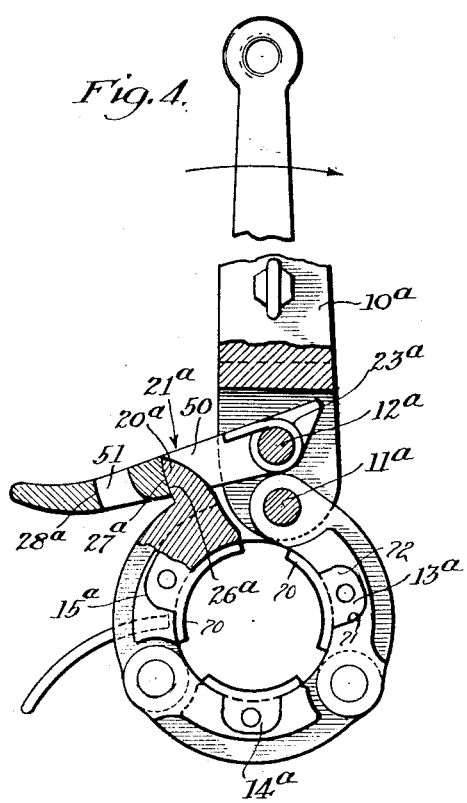
Figure 6:
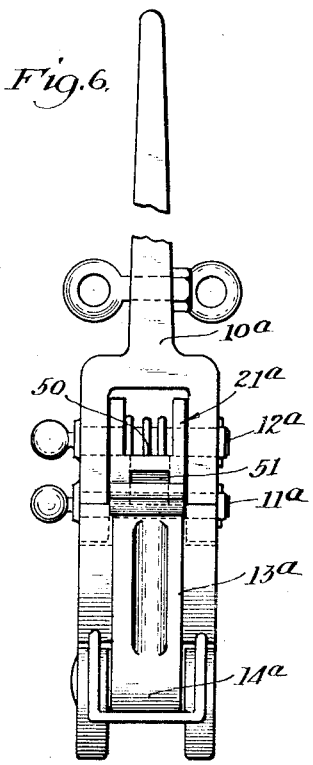
Figures 5, 7:
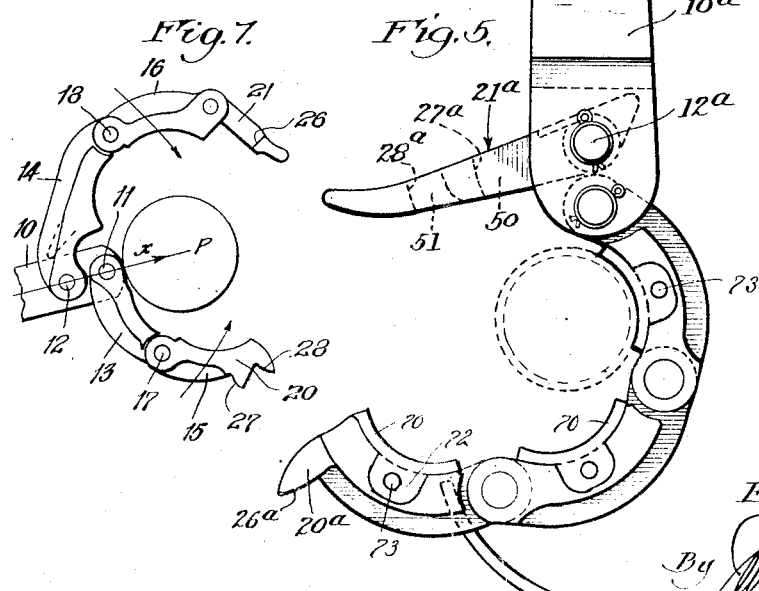

Fig. 3ª is a detail sectional view taken as indicated by line 3ª—3ª on Fig. 1; Fig. 4 is a plan, partly in section, showing my invention applied to another type of tongs in closed position;

Fig. 5 is a plan showing the same open around a pipe;

Fig. 6 is an edge view of the tongs;

Fig. 7 is a diagrammatic view illustrating the movements of the several parts when the improved tongs are being applied to a pipe.

Figure 2:
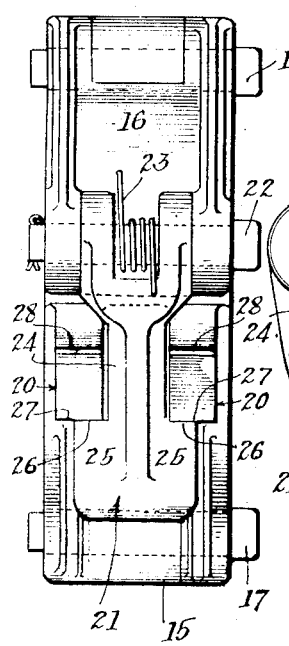
Fig. 2 is an end elevation of the tongs.

In the drawings the tongs is shown with a handle 10 to which are pivoted at 11 and 12 respectively, two of the pipe encircling segments 13 and 14. The two pivots 11 and 12 are offset in such a manner that movement of the handle will constrict the pipe encircling segments about the pipe, as will be well understood. The details of construction of the pipe encircling segments need not here be gone into. Two more pipe encircling segments 15 and 16 are pivoted at 17 and 18, respectively, to the two segments 13 and 14, respectively; and the four segments together will completely encircle a pipe. The outer end of segment 15 is provided with latch lugs 20, here shown as two in number and spaced apart as indicated in Figs. 2 and 3. The end of segment 16 is provided with a pivoted latch 21, mounted on a pivot pin 22 and spring pressed, by a spring 23, in the direction indicated by the arrow in Fig. 1, so that the pivoted latch is at all times pressed inwardly toward the lugs 20. In the particular form of latch herein illustrated, the latch has a relatively narrow shank 24 that extends between the spaced lugs 20 and a relatively wide head 25 having shoulders 26 thereon adapted to engage with shoulders 27 and 28 of lugs 20. It will be readily understood however that this particular construction and arrangement of the lugs is not an essential to the broader aspect of my invention, as the latch and its arrangement relative to the latching lugs may be varied. For instance, instead of the latch extending between two latching lugs, it can be made to operate on one latching lug, although a symmetrical arrangement is more desirable; or the latch may be made in the shape of a clevis, or loops to extend around a single latching lug.

It will be noted that the two latching shoulders 27 and 28 on the lug 20 are circumferentially spaced from each other in such a manner that, when latch shoulder 26 engages shoulders 27 the casing encircling structure formed by the segments is closed down to its minimum diameter, while when latch shoulders 26 engage shoulders 28, the structure is opened out to its maximum diameter. The exact location, and the relative spacings of the shoulders 27 and 28, and the number of spaced shoulders, may be chosen to adapt the tongs to any desired sizes. For instance, it may be in many cases desirable to make the latch device so that it can be closed to make the tongs applicable both to a pipe and to its collar. Then such a tongs may be easily applied to either the pipe or the collar, and without any necessity on the part of the operator selecting the shoulder (27 or 28) that the latch is going to engage with. Handles 30 are mounted on segments 15 and 16, and with these handles, or with the aid of such an automatic self closing device as is explained in the copending application of Deakins and Hamer, Ser. No. 595,693, filed October 19th, 1922, entitled "Self closing pipe tongs," these tongs may be closed around the pipe or around the pipe collar. For instance, if the tongs are to be closed around the pipe, it is only necessary to throw the segments 15 and 16 into their closed position, when the latch will operate to automatically catch on the proper shoulder 27; and in case of closure around the pipe collar the latch will catch automatically on shoulder 28. No attention in this regard is required of the operator.

Figure 7 illustrates, more or less diagrammatically, a pipe tongs embodying the present invention in a typical open position, and being applied to a pipe P. In applying the tongs to a pipe, the tongs are moved longitudinally of the handle 10, substantially in line with the axis of the handle onto the pipe. The arrow $x$ in the sketch indicates the direction of movement of the tongs as a whole onto the pipe, and the figure shows the position of the parts assumed as the tongs or the end of the handle strikes the pipe. Tongs of the type and character herein referred to are very heavy, and are usually supported on cranes. They are used very largely on well pipe and drill pipe which stands vertically and the tongs are supported by an eye in the handle or by a bridle attached to the handle. Being very heavy, it is practically impossible to manipulate them, and it is only possible to move them in some simple manner, as, for instance, in substantially a straight line movement in some selected direction. Such straight line movement is all that is necessary, both to cause the tongs constructed in accordance with the present invention, to close about a pipe and to cause them to automatically latch in proper position about the particular pipe to which they are being applied.

When the tongs or the end of the handle strikes the pipe P, movement of the tongs as a whole in the direction of the arrow $x$ stops; but the momentum of the jaws causes them to move on and further causes the jaws at each side to swing as a whole about the two pivotal centers 11 and 12 on the handle. This causes both series of jaws (both pairs of jaws at opposite sides of the pipe) to swing together and close upon the pipe; and when jaws 13 and 14 have come into contact with the pipe, and thus had their swinging movement stopped, then the swinging momentum of the jaws causes jaws 15 and 16 to continue, if necessary, to swing upon the pipe, this continued separate action of jaws 15 and 16 being a swinging action about the individual pivots 17 and 18. As the jaws 15 and 16 come together, the latch 21 rides over the latch lugs 20, and, if the pipe is one of larger size, engages with the first lug 28 over which it rides, while if the pipe is of the smaller size, the latch goes on and rides over and engages the second lug 27.

The operation of engaging the improved tongs with a pipe will, it is to be noted, not involve any swinging of the handle to a position which would tend to constrict the jaws. In order to allow automatic latching to take place it is necessary that the pipe encircling elements be in such relative position that the jaws will be relatively loose about the pipe, allowing the free ends of jaws 15 and 16 to come closer together than they will afterwards be, so that the latch shoulder can drop over the proper lug shoulder. When the improved tongs, or the end of the handle, hits the pipe there is no tendency for this abrupt stoppage to swing the handle in either one direction or the other, and therefore, no tendency for the handle to be swung by its own momentum to its jaw-constricting position.

The present invention provides, in combination with the means above described for varying the size of the structure formed by the segments and thus varying the capacity of the tongs, further means for varying the capacity of the tongs independently or in combination with the first described means. Bushings 70 are provided to fit within the structure formed by the segments to vary its effective size. I prefer to provide as many bushings 70 as there are segments and to mount the bushings in the segments so that they can be readily arranged in place or removed and so that they are secure when in place. In accordance with the preferred form of the invention I provide a recess 71 in the upper inner part of each segment and I provide lugs 72 on the bushings to fit into the recesses. As a means for holding the lugs 72 in the recesses 71 I provide upwardly extending studs 73 in the recesses and form the lugs 72 with opening to receive the studs. When the tongs is in operation with the bushings in place the strain which comes between the bushings and the segments is taken by the lugs 72 and does not come upon the studs or other means that may be employed in place of the studs. In practice a tongs may be provided with several sets of bushings of different sizes to give it wide range of size variation. With tongs designed so that the latch device allows it to be set to operate on a pipe or its collar a set of bushings may be provided which will allow the tongs to operate on a pipe of another size and its collar.

It will be understood my invention may be applied to various forms of tongs and is not restricted to the particular ones here described. For instance, the tongs of Figs. 1 to 3 may have any number of segments. And as a further instance I have shown the invention in Figs. 4 to 6 applied to another form of tongs—specifically the form that is the subject matter of my application on tongs, Ser. No. 524,937, filed Dec. 29, 1921. Here I show a tongs having a handle 10ª to which three inter-pivoted segments 13ª, 14ª, and 15ª are pivoted at 11ª. The distinctive feature of this structure is that the segments are all pivoted in one series to the handle; but it will be understood that the number of segments may be one or more up to any practical number. Here the latch 21ª is pivoted at 12ª directly to the handle; and I have also here shown a modified latch that is in the general form of a loop rather than of a T as in Figs. 1 to 3. This loop shaped latch has two (it can have any number) of spaced openings 50 and 51 adapted to receive latch lug 20ª on segment 15ª. The latch is pressed toward segment 15ª by a spring 23ª, and the lug can catch in either opening, depending on the size of pipe to which the tongs is applied. The engaging surfaces 27ª and 28ª of the latch are made concentric with pivot 12ª; and the engaging surface 26ª of the lug is preferably formed so as to conform as closely as practicable to both surfaces 27ª and 28ª so as to get a good bearing between the latch and lug. This arrangement provides that the reaction forces tending to expand the tongs shall not tend to throw the latch out and at the same time makes the latch close easily over the lug.

This same arrangement of latch and lug engaging surfaces is maintained in the device of Figs. 1 to 3; where latch surfaces 26 are concentric with pivot 22 and lug surfaces 27 and 28 are made to conform to that curvature so that either of them will bed firmly on the latch surface.

This last described form of construction may, as I have illustrated in the drawings, be provided with removable bushings 70 as hereinabove described in the case of the first form of construction.

From the foregoing illustrative description my invention will be readily understood. And it will be fully understood that various changes and modifications may be made other than those mentioned herein. Accordingly I do not wish to limit the invention to the specific things herein described, except as is stated in the following claims:—

Having described a preferred form of my invention, I claim:

1. A pipe tongs adapted to take work of different diameters, including a lever, two oppositely disposed series of pivotally interconnected pipe encircling segments, each series pivotally connected at one end to the lever and the two series being substantially alike, and lying in substantially symmetrical relation with reference to the longitudinal axis of the lever, and a resiliently actuated latch mechanism to latch the two series together selectively in position to encircle pipe or the like of different diameters, said latch mechanism including a latch member on one segment and a lug member on the other, one of said members having a plurality of latch engaging shoulders spaced apart in a direction circumferential of the pipe, spring means urging the latch and lug members into latching engagement, and the lug and latch members being shaped so that the latch member rides up over the lug member as the tongs are closed around a pipe and selectively engages with either of its shoulders.

2. In a pipe tongs adapted to take work of different diameters, the combination of an operating handle, inner opposed gripping jaws pivoted to the handle, outer opposed gripping jaws pivotally connected to the inner jaws, said outer jaws being movable on their pivotal centers to open and close the tongs whereby the work may be inserted into and removed from the tongs, and means acting automatically on closure of the jaws for detachably connecting the outer jaws together in any one of a plurality of relative positions to secure the jaws around work of different sizes.

3. In a pipe tongs adapted to take work of different diameters, the combination of an operating handle, inner opposed gripping jaws pivoted to the handle, outer opposed gripping jaws pivotally connected to the inner jaws, said outer jaws being movable on their pivotal centers to open and close the tongs whereby the work may be inserted into and removed from the tongs, and means acting automatically on closure of the jaws for detachably connecting the outer jaws together in any one of a plurality of relative positions to secure the jaws around work of different sizes, said means embodying a spring pressed latch member on one of the outer jaws, and a lug member on the other of the outer jaws, one of said members having a plurality of spaced latch engaging shoulders.

4. In a pipe tongs adapted to take work of different diameters, a lever, two pairs of pipe encircling segments pivoted one segment of each pair to the lever and the other segment of each pair to the first mentioned one of that pair, the pairs of segments being movable oppositely to each other and arranged substantially symmetrically with reference to the longitudinal axis of the lever, and means acting automatically on closure of the jaws for detachably connecting the last mentioned segments together in any one of a plurality of relative positions to secure the segments around work of different sizes.

5. In a pipe tongs adapted to take work of different diameters, a lever handle, two pipe encircling elements pivoted each at one end to the lever handle at spaced points, so that swinging of the lever handle about either pivot causes the elements to constrict or loosen about the pipe, said elements being arcuate in form and extending from the handle so that their free swinging ends meet substantially opposite the handle, and means acting automatically on closure of the elements about a pipe to detachably connect the free ends of the elements together in any one of a plurality of positions relative to each other to secure the segments around work of different sizes.

6. In a pipe tongs adapted to take work of different diameters, a lever handle, two pipe encircling elements pivoted each at one end to the lever handle at spaced points, so that swinging of the lever handle about either pivot causes the elements to constrict or loosen about the pipe, said elements being arcuate in form and extending from the handle so that their free swinging ends meet substantially opposite the handle, and means acting automatically on closure of the elements about a pipe to detachably connect the free ends of the elements together in any one of a plurality of positions relative to each other to secure the segments around work of different sizes, said means embodying a spring pressed latch member on one element and a lug member on the other, one of said members having a plurality of circumferentially spaced latch shoulders, and the lug and latch being so formed that the latch rides up over the lug to interengage any one of said spaced shoulders.

7. In a pipe tongs adapted to take work of different diameters, a lever handle and a pair of pipe encircling elements each pivoted to the handle, such pivots being spaced apart so that movement of the handle closes and opens the elements at their pivoted ends, the elements extending outwardly from their pivots to meet at a point substantially on the opposite side of a pipe from the handle and substantially on the axis of the lever handle produced, and means acting automatically on closure of the jaws to detachably connect the outer ends of the elements in a plurality of positions relative to each other; whereby said elements are expansive and contractive at the handle and at a point substantially opposite the handle.

8. In a pipe tongs adapted to take work of different diameters, a lever handle and a pair of pipe encircling elements each pivoted to the handle, such pivots being spaced apart so that movement of the handle closes and opens the elements at their pivoted ends, the elements extending outwardly from their pivots to meet at a point substantially on the opposite side of a pipe from the handle and substantially on the axis of the lever handle produced, and means acting automatically on closure of the jaws to detachably connect the outer ends of the elements in a plurality of relative positions, said means embodying a spring actuated latch member on one element and a lug member on the other element, one of said members having a plurality of latching shoulders with which the other member may selectively engage; whereby said elements are expansive and contractive at the handle and at a point substantially opposite the handle.

In witness that I claim the foregoing I have hereunto subscribed my name this 28" day of September 1922.

ELIHU C. WILSON.